US007976663B2

(12) United States Patent
Hukki et al.

(10) Patent No.: US 7,976,663 B2
(45) Date of Patent: Jul. 12, 2011

(54) METHOD OF MAKING A SCREEN ELEMENT

(75) Inventors: Ari M. Hukki, Boynton Beach, FL (US); Glenn T. Lilie, Pearland, TX (US)

(73) Assignee: CPI Wirecloth & Screens, Inc., Pearland, TX (US)

( * ) Notice: Subject to any disclaimer, the term of this patent is extended or adjusted under 35 U.S.C. 154(b) by 0 days.

(21) Appl. No.: 12/831,430

(22) Filed: Jul. 7, 2010

(65) Prior Publication Data

US 2010/0272952 A1 Oct. 28, 2010

(51) Int. Cl.
*B29C 51/16* (2006.01)
*B07B 1/46* (2006.01)
*B07B 1/48* (2006.01)

(52) U.S. Cl. ........................................ 156/196; 156/212

(58) Field of Classification Search .................. 156/196, 156/212
See application file for complete search history.

(56) References Cited

U.S. PATENT DOCUMENTS

| | | | | |
|---|---|---|---|---|
| 2,941,570 | A * | 6/1960 | Plym | 156/156 |
| 6,269,953 | B1 * | 8/2001 | Seyffert et al. | 209/399 |
| 2007/0221313 | A1 * | 9/2007 | Franck et al. | 156/91 |

* cited by examiner

*Primary Examiner* — John L. Goff
*Assistant Examiner* — Barbara J. Musser
(74) *Attorney, Agent, or Firm* — Strasburger & Price, LLP

(57) ABSTRACT

Methods of manufacturing screen elements for use with vibratory separators are disclosed. The screen elements include a curved structural frame with perforations therein, the perforations designed to maximize both open area and process liquid throughput. At least one layer of screen cloth is attached to the curved structural frame by means of fluidized powdered epoxy resin.

20 Claims, 8 Drawing Sheets

METHOD OF MAKING A SCREEN ELEMENT

CROSS-REFERENCE TO RELATED APPLICATIONS

This Non-Provisional Patent Application, filed under 35 U.S.C. §111(a), claims the benefit under 35 U.S.C. §119(e)(1) of U.S. Provisional Patent Application No. 60/839,141, filed under 35 U.S.C. §111(b) on Aug. 16, 2006, and which is hereby incorporated by reference in its entirety and U.S. non-Provisional application Ser. No. 11/893,480, filed Aug. 16, 2007, now abandoned. This Non-Provisional Patent Application is related to U.S. application Ser. No. 10/922,342, entitled "Screen assemblies utilizing screen elements retained in perforated troughs," and filed on Aug. 20, 2004 now abandoned, and to U.S. Provisional Patent Application No. 60/838,565, entitled "Screen assemblies utilizing screen elements retained in perforated supports," and filed on Aug. 18, 2006.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates generally to methods of manufacturing an apparatus with which material is separated or assorted according to size or dimensions of components by presentation to a series of openings or passages through which the components having dimensions below those of the openings or passages pass while those having dimensions greater than those of the passages or openings do not pass through. More specifically, the present invention relates to methods of manufacturing screen assemblies used in vibratory separators.

2. Description of Related Art

Vibratory screen separators with replaceable screen assemblies have long been known, and include a base, a resiliently mounted housing, a vibratory drive connected to the housing, and screen assemblies positioned on the housing. The screen assemblies are periodically replaced when process conditions dictate or when the performance of the screening media degrades due to abrasion, failure, or blinding. The screening media can be flat or pleated, single or multi-layered, laminated or un-laminated. Screen assemblies include screening media bonded to components structural in nature that are used to fasten or tension the screening media to a vibratory separator so that the motion of the separator is imparted to the screening media.

Flexible rectangular screen assemblies constructed by using structural components that form a "J" or similar shape on two sides of screen are known as hookstrip style screens. Hookstrip style screens are fastened to vibratory separators by pulling the screen assembly taut over a crowned deck. The "crown" or "radius" in the deck is necessary because the geometry of the crown keeps the flexible screen in contact with the vibrating deck without approaching tension levels that would damage the screening media.

Screen assemblies constructed by bonding screening media to rectangular structural frames that minimize the flexibility of the screen assembly are known as panel style screens. The structural frame may or may not have internal supporting cross members. Panel style screens are fastened to vibratory separators by clamping one or more surfaces of the structural frame to a mating surface (or deck) of the vibratory separator. The decks of vibratory separators that accept panel screens are noticeably less crowned than the decks of vibratory separators that accept hookstrip style screens, but the decks are usually slightly crowned to prevent panel style screens from flexing or chattering when the vibratory separator is in motion.

BRIEF SUMMARY OF THE INVENTION

The present invention is directed to novel methods of manufacturing screen elements for vibratory separators, especially in mass production environment. Such screen assemblies include a structural frame that is mounted in a vibratory separator into which a plurality of lightweight and flexible screen elements are inserted into multiple rows of perforated screen supports. The perforated screen supports are bonded to each other and to the structural frame. The perforated screen supports are aligned parallel to the direction in which solids are conveyed by the vibratory motion. The perforated screen supports are assembled to the structural frame so that unscreened material cannot substantially bypass the screening media. The cross sectional geometry of the perforated screen support and of the formed screen elements can be rectangular, triangular, half-circular, half-ellipsoid, catenary, hyperbola, or other similar geometric shape. The screen elements include one or more layers of screening media that may be bonded to each other and may be preformed to conform to the geometry of the perforated screen support.

The present invention provides methods of manufacturing screen elements that substantially increase the available area for screening compared to the available area of the prior art when a screen assembly creates a flat or crowned screening surface on a vibratory separator. Furthermore, the ease of replacing small, (typically three inches wide and 24 inches long) and lightweight (typically less than one pound) individual screen elements in the present invention saves time and material by eliminating the periodic replacement of large, heavy, and cumbersome screen assemblies in conventional vibratory separators. Typically, these conventional screen assemblies weigh anywhere from 20 to 50 pounds and are approximately two to three feet long and up to four feet wide. In addition, when the present invention is used to replace hookstrip style screens with crowned screening surfaces, the effective screening area is increased by channeling the flow of unscreened material and preventing the pooling of liquid on either side of a crown deck. The crowned screen deck causes the processed material to flow away from the center of the screen (the crown) towards the sides, causing a large area of the screen surface to be under-utilized.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Example 1

Screen Element Frame Manufacturing Steps

Figure 1:
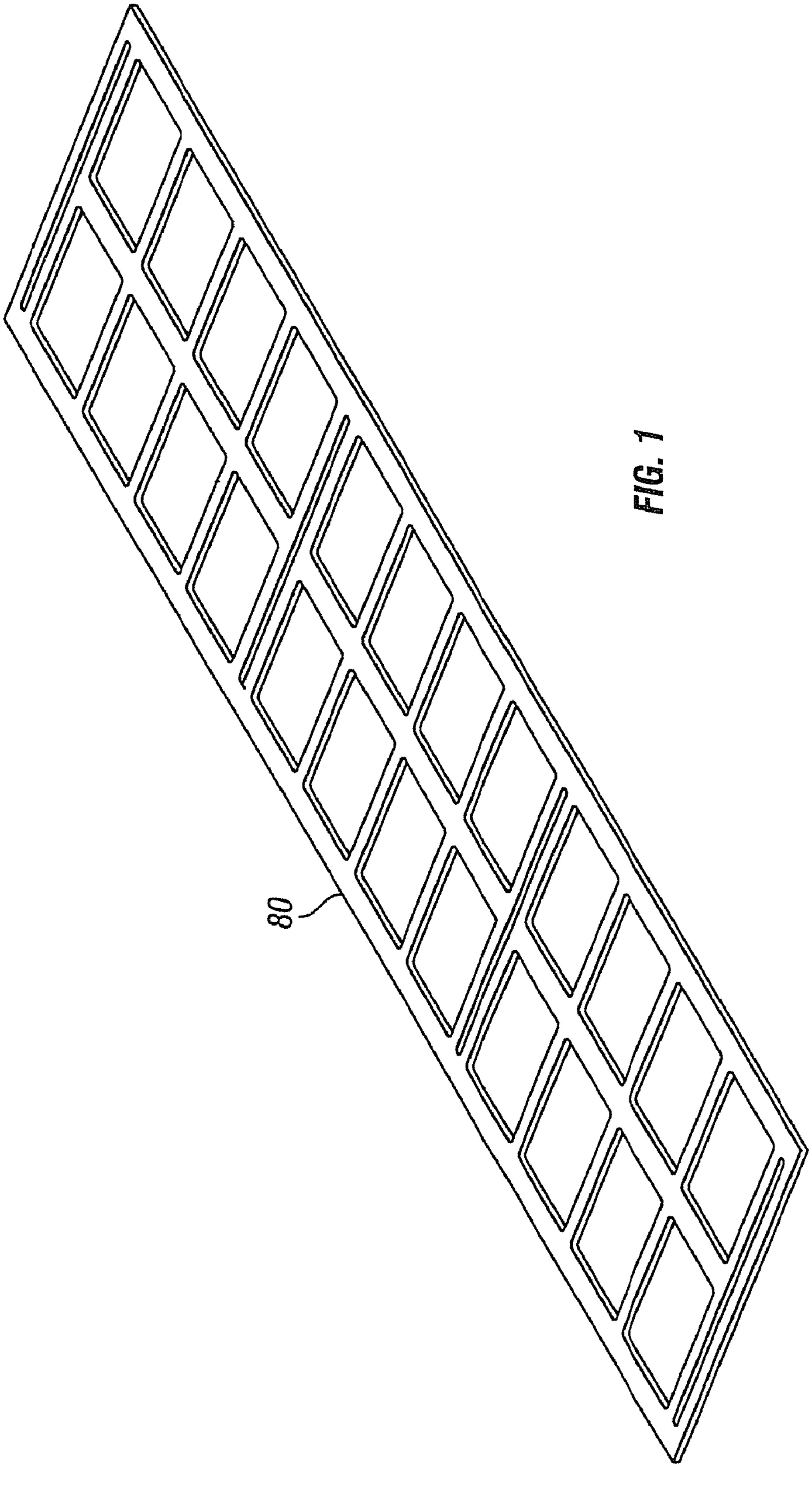
FIG. 1 shows a screen element frame created by perforating a sheet of thin metal plate—preferably flat—to achieve a preferred pattern.

The invention features, in one aspect, a screen element frame (80) created by perforating a sheet of thin metal plate, preferably flat, to achieve a preferred pattern (FIG. 1). The perforation pattern is designed to maximize open area, to provide adequate heat capacity for powder coating requirements (discussed below), and to give proper support for the precut screen cloth layers (92).

Figure 2:
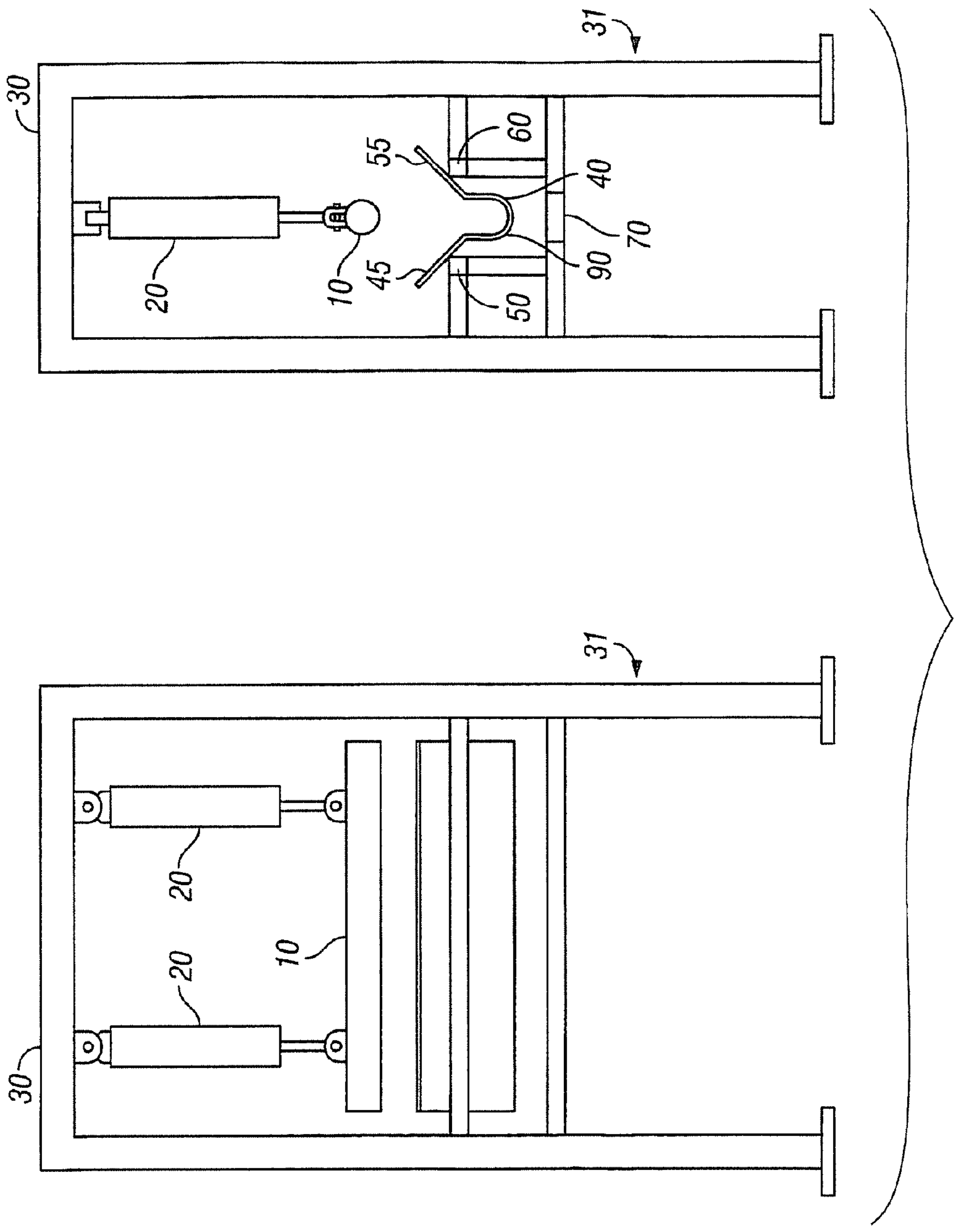
FIG. 2 shows a screen element forming or molding press according to the present invention.
Figure 3:
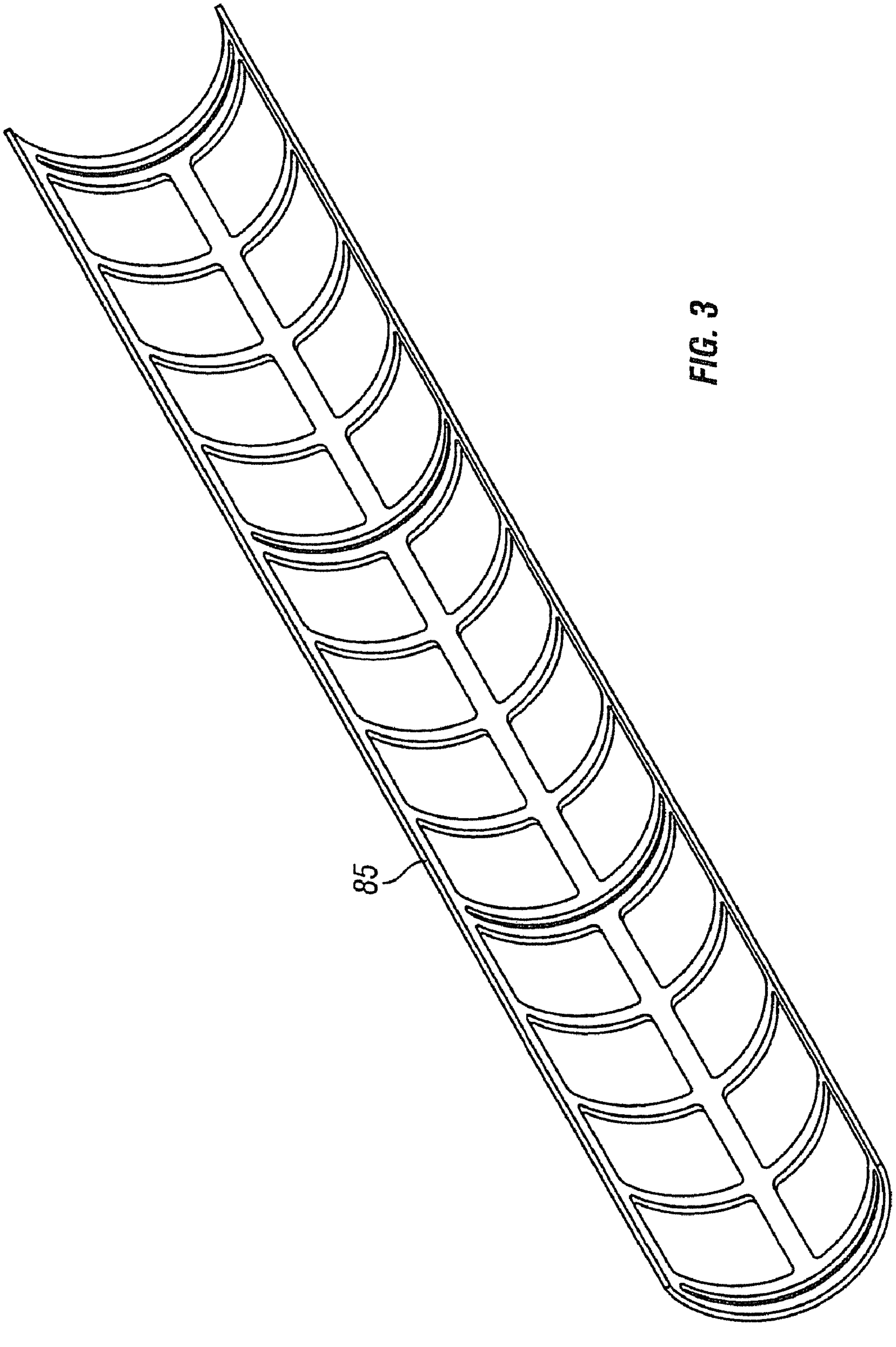
FIG. 3 shows a formed screen element frame—a screen element frame of FIG. 1 formed to a predetermined diameter by the molding press of FIG. 2.
Figure 4:
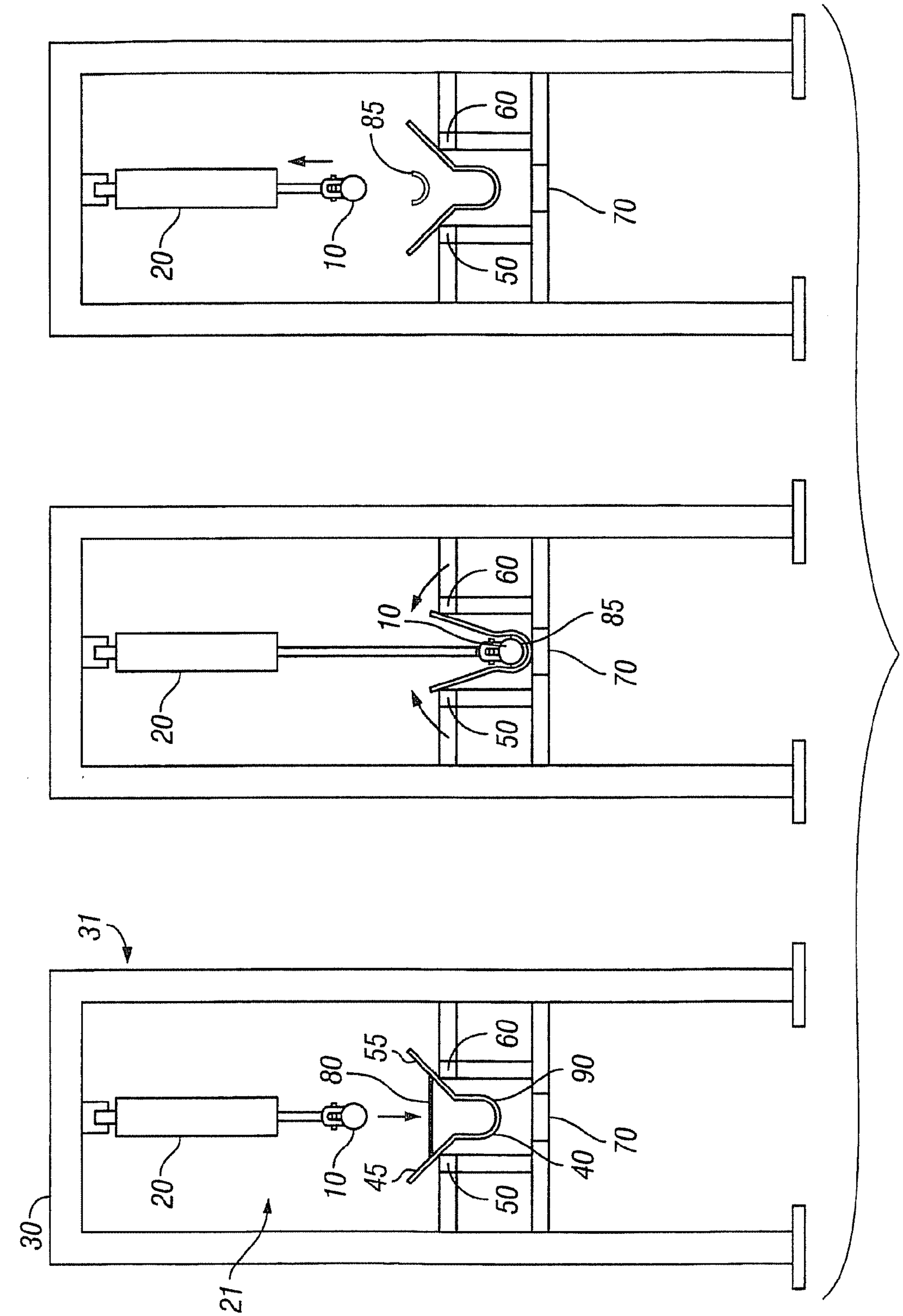
FIG. 4 shows the screen element forming or molding press at different stages of operation, acting upon a screen element frame to produce a formed screen element frame.
Figure 10:
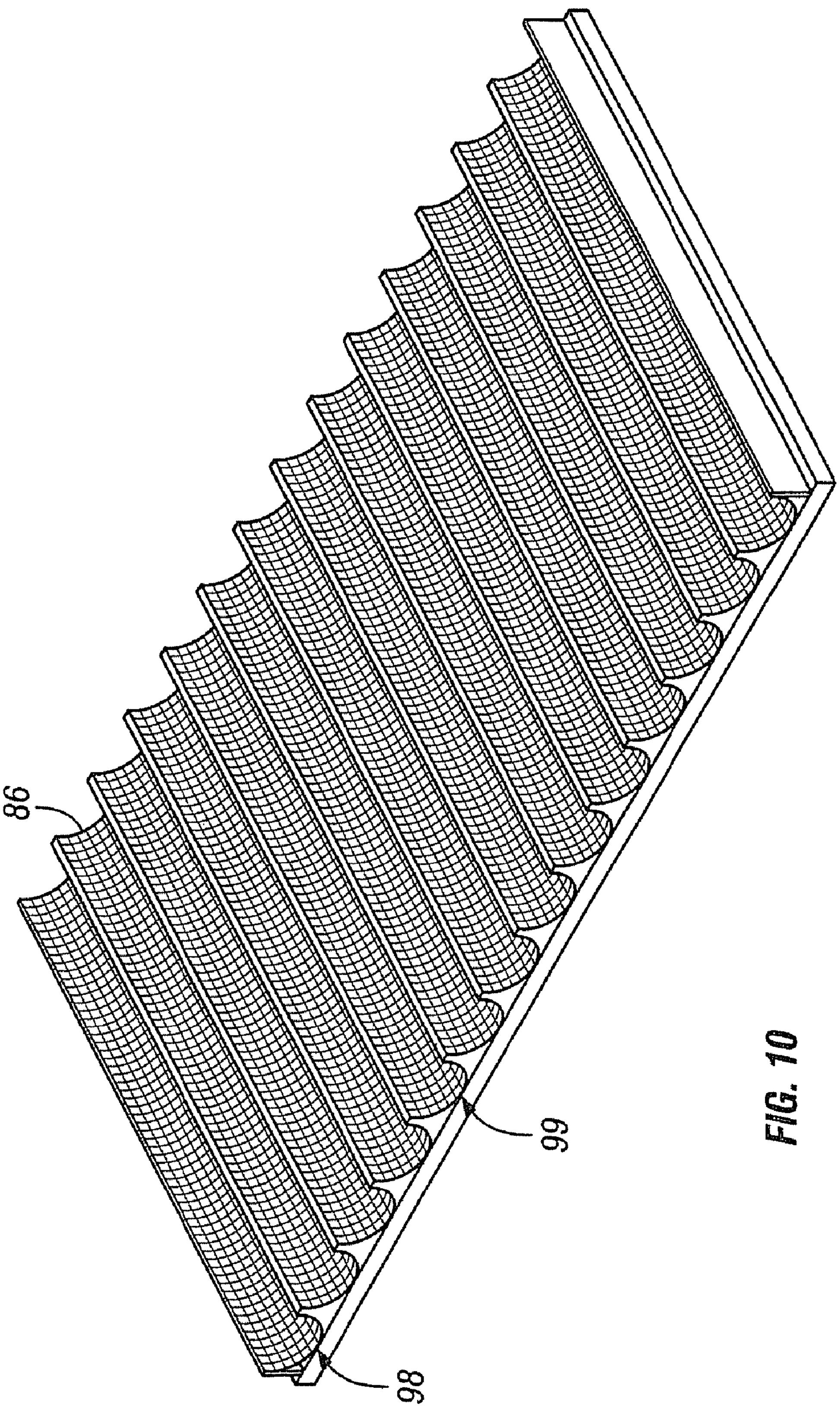
FIG. 10 shows a support frame assembly.

Using a special molding press (31), the screen element frame (80) is then curved to a predetermined diameter, thus forming a curved screen element frame (85) (FIGS. 2, 3, & 4). This process maximizes the overall screen area and at the same time permits use of the entire available shaker (not shown) width for any shakers of the prior art. The molding press (31) is designed to produce an exact amount of curvature to the curved screen element frame (85) with a unique feature in the frame forming press cradle (40) design utilizing the two cradle side extensions (45, 55) that are forced towards each other by horizontal side supports (50, 60), respectively, to increase the roundness of the semi-circular cradle bottom (90) when the frame forming press cradle (40) is pushed down against the support beam (70), as shown in FIG. 4. The semi-circular cradle bottom (90) of the frame forming press cradle (40) will wrap around the forming element (10) as the horizontal side supports (50, 60) force up the side extensions thus extending the proper curvature all the way to the edges of the curved screen element frame (85) being formed. This is important in order for the finished screen element (86) be seated properly into the support frame (98), shown in FIG. 10, to provide sealing (99) between the finished screen element (86) and the support frame (98) to minimize potential process liquid bypass (not shown).

The exact forming method is described in Example 5, "Description of the frame forming press," below.

Example 2

Curved Element Frame Coating

The curved screen element frame (85), shown in FIG. 3, is then cleaned to be free of contaminants such as oil, dirt, etc. by dipping it into a hot caustic bath. This is important for the epoxy (25) to properly adhere to the surface, as discussed below.

The curved screen element frame (85) is then heated in an oven (not shown) of any type for metal heating of the prior art. Normal temperature range for epoxy coating of metal components is 400 to 500° F., however, higher temperatures (up to 600+° F.) may be required due to the small volume of metal in the curved screen element frame (85), to compensate for rapid heat loss depending of the time it takes to move the curved screen element frame (85) from the oven to the fluidized bed (14), shown in FIG. 5. Generally, the curved screen element frame (85) is heated to a temperature which lies between the sintering point and the decomposition point of the coating composition (the epoxy), and below the deteriorating point of the curved element frame.

Figure 7:
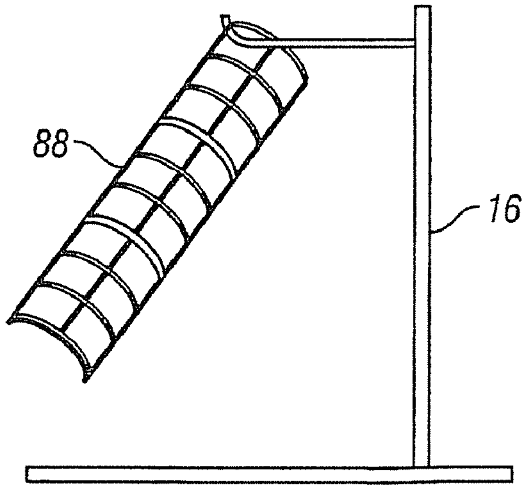
FIG. 7 shows a cooling rack.

The hot curved screen element frame (85) is then dipped into a fluidized bed (14) containing special epoxy (25), specially designed to have low heat cure temperature and a suitable thixotropic index to prevent molten epoxy (25) from spreading, during the laminating process, into areas of screen cloth (92) covering the perforations in the curved screen element frame (85). The curved screen element frame (85) is kept in the fluidized epoxy (25) for three to five seconds. Depending on the desired epoxy coat thickness, a longer or shorter time—such as one to seven seconds—may be needed. The coated frame (88) is then placed on a cooling rack (16) to cool (FIG. 7). It is important to understand that the epoxy (25) on the curved screen element frame (85) has not been cured i.e. the molecules have not fully cross linked. This state of cure is called a B-stage cure. The purpose of this type of cure is to allow the epoxy coating to be re-melted in order to laminate the precut screen cloth layers (92) into it. To cure the epoxy requires that it be maintained at an elevated temperature for a sufficient time to cure the coating, as will be described below.

Example 3

Coated Frame Lamination

Figure 8:
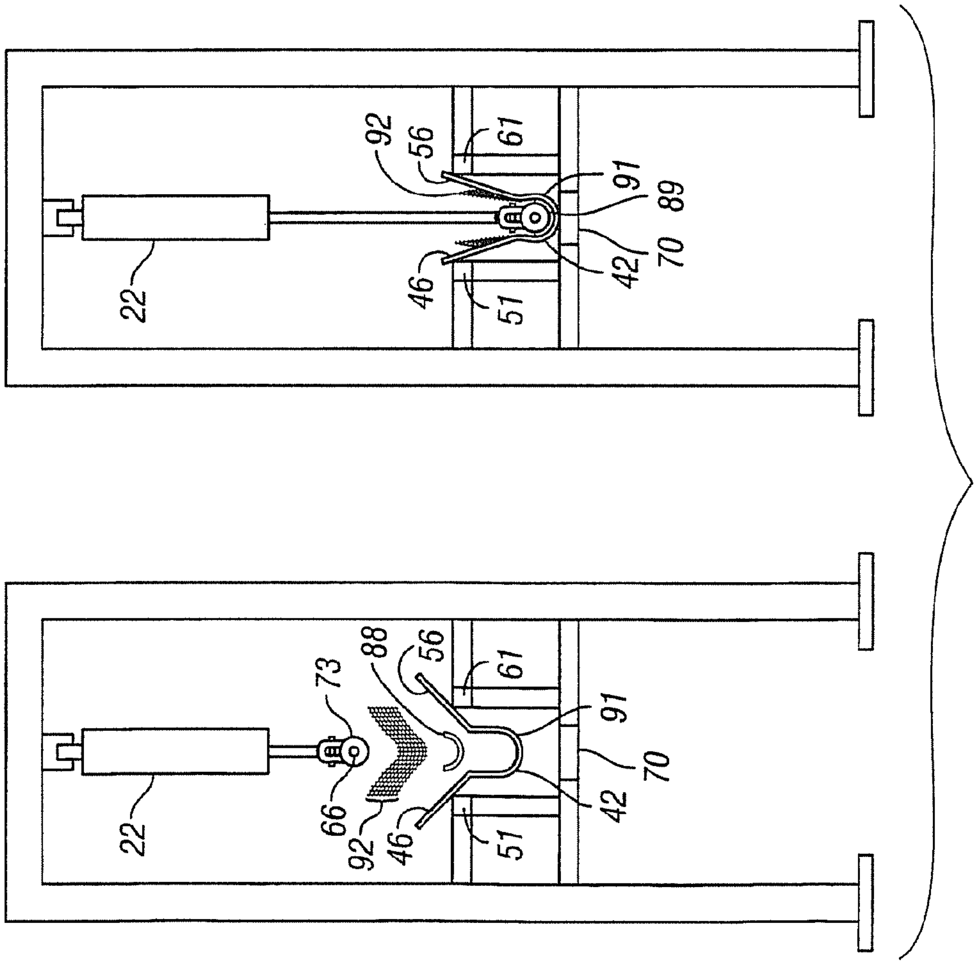
FIG. 8 shows a screen element laminating press.

The heat lamination press cradle (42) of FIG. 8 is substantially the same as the frame forming press cradle (40) of FIG. 4, with the exception of having a slightly larger cradle bottom (91) diameter to allow the coated frame (88) and the precut screen cloth layers (92) to properly fit into it. A round heating element (73) is attached to pneumatic cylinders (22). The round heating element (73) is located directly above and is aligned parallel to the heat lamination press cradle (42). The round heating element (73) has a tubular internal heating element (66) mounted substantially in the center of round heating element (73).

The coated frame (88) is placed into the special heat lamination press cradle (42), as shown at FIG. 8. Precut screen cloth layers (92) (1 to 3 separate layers) are placed over the coated frame (88). The round heating element (73) is then lowered into the heat lamination press cradle (42). The temperature achieved by the round heating element (73) is sufficient to re-melt the epoxy coating of the coated frame (88). The heat lamination press cradle (42) is designed such that when the round heating element (73) is pushing down on it, the sides of the heat lamination press cradle (42) are forced against the coated frame (88), causing in turn very uniform pressure on the coated frame (88) and the precut screen cloth layers (92) against the round heating element (73). This provides uniform melting ("fluidizing") of the epoxy (25). The uniform pressure is a result of the heat lamination press cradle (42) being pushed down against the support beam (70) and the heat lamination press cradle (42) cradle side extensions (46, 56) will force the cradle bottom (91) shape more towards a full circle thus forcing the coated frame (88) with the precut screen cloth layers (92) to be wrapped around the round heating element (73) very tightly.

The round heating element (73) is then kept down in the heat lamination press cradle (42) at sufficient temperature and for a predetermined amount of time, preferably about four to five minutes, for the epoxy (25) coating to first melt and be forced through all the precut screen cloth layers (92) and then to cure it. It will be appreciated by those skilled in the art that the temperature and time required to cure any epoxy that could be used with the present invention may depend on particular characteristics of the epoxy used, but that such temperature and time are readily ascertainable by one skilled in the art without undue experimentation.

Figure 9:
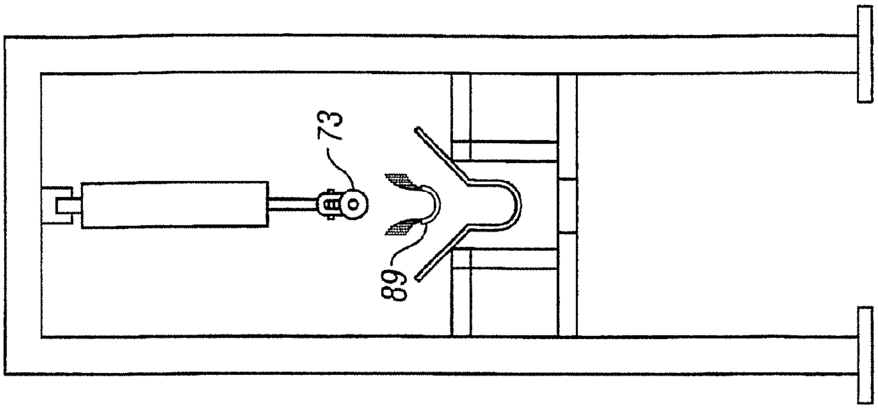
FIG. 9 shows the removal of a round heating element from a laminated screen element.

The round heating element (73) is then lifted up, and the laminated screen element (89) is removed from the heat lamination press cradle (42) and allowed to cool (FIG. 9).

Example 4

Laminated Screen Element Trimming

Figure 6:
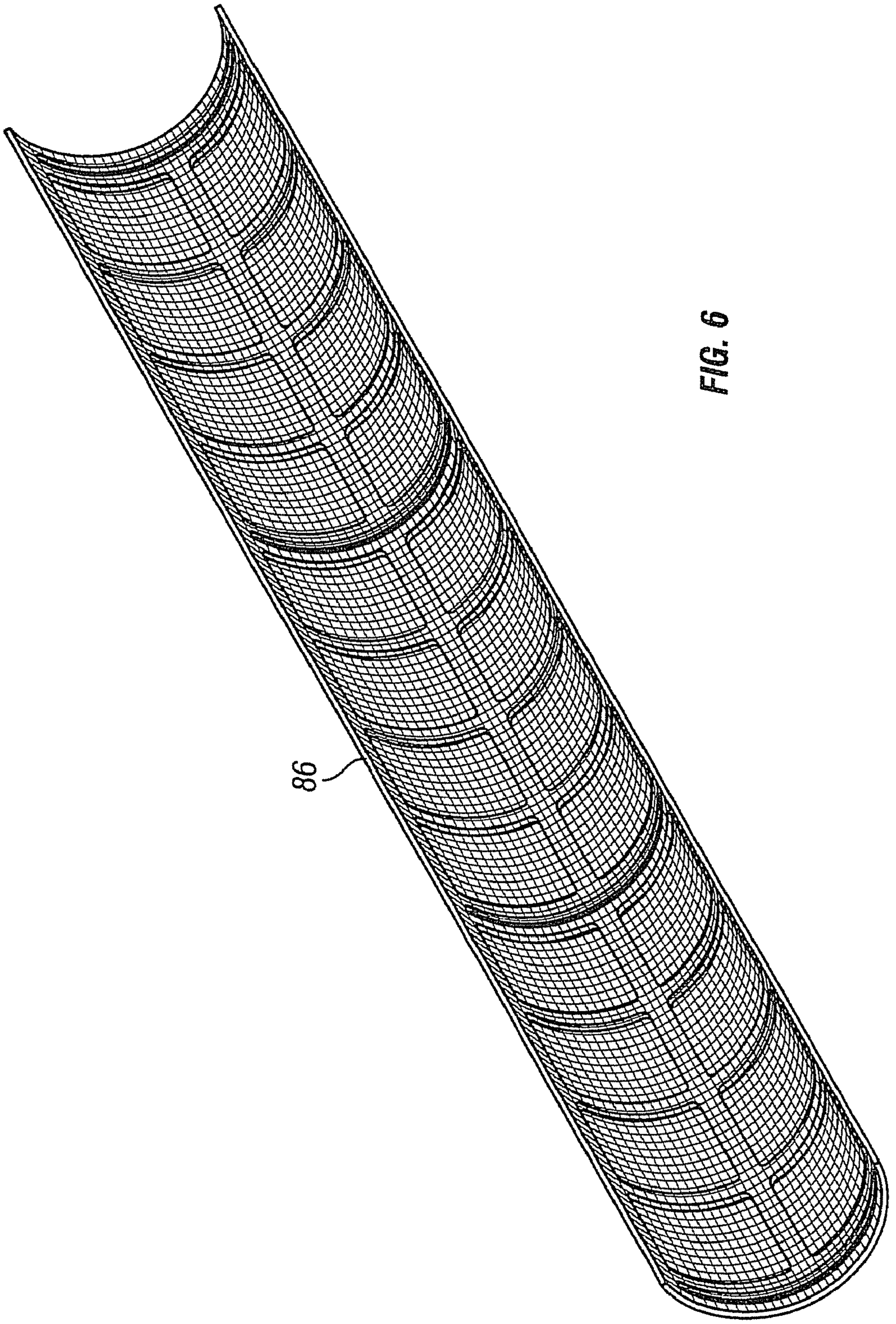
FIG. 6 shows a finished screen element.

Once the laminated screen element (89) has been cooled, all excess screen cloth will be trimmed away along the outer edges of the laminated screen element (89) curved screen element frame (85), yielding a finished screen element (86) as shown at FIG. 6. The finished screen element (86) is then labeled to indicate the cut point, checked for defects and boxed for shipping.

Preferably, curved screen element frame (85) should be constructed of material that would allow adequate support for the precut screen cloth layers (92), such as carbon or stainless steel.

Also preferably, the curved screen element frame (85) should have the maximum open area possible to maximize process liquid throughput.

Also preferably, the curved screen element frame (85) should be made of material at allows precut screen cloth layers (92) to attach to it by fluidized epoxy (25), such as carbon or stainless steel.

Also preferably, the curved screen element frame (85) should be light weight, inexpensive and suitable for mass production.

Also preferably, the finished screen element (89) should retain its designed shape to facilitate installation into a support frame (98).

Also preferably, the element (89) should withstand the process environment long enough to yield lower overall operating cost.

Example 5

Description of the Frame Forming Press

FIG. 4 shows the principle of operation of the screen element frame forming press (21). The forming element (10) is mounted on a plurality of air or hydraulic cylinders (20). The hydraulic cylinders (20) are mounted on a support structure (30). The frame forming press cradle (40) is placed under the forming element (10) between two horizontal side supports (50, 60). The frame forming press cradle (40) is shaped in a special way, preferably with a semi-circular cradle bottom (90) and cradle side extensions (45, 55) extending outward in approximately 45 degree angle (FIGS. 2 & 4). Approximately 1 inch under the bottom of the frame forming press cradle (40) is a horizontal support beam (70), as shown by FIG. 4. The flat screen element frame (80) is placed approximately horizontally between the cradle side extensions (45, 55) in FIG. 4. The forming element (10) is then lowered onto the flat screen element frame (80) and then allowed to push the screen element frame (80) down into the frame forming press cradle (40). When the forming element (10) hits the bottom of the frame forming press cradle (40), the cradle with the screen element frame (80) in it is then pushed further down until the bottom of the frame forming press cradle (40) comes in contact with the support beam (70) underneath, preventing any more downward movement (FIG. 4). While the frame forming press cradle (40) is pushed down, the outward pointing cradle side extensions (45, 55) will slide between the horizontal side supports (50, 60), respectively, forcing the curvature of the semi-circular cradle bottom (90) of the frame forming press cradle (40) to be more than a half circle thereby forcing the long sides of the screen element frame (80) to conform to the shape of the forming element (10). The forming element (10) is then lifted up from the frame forming press cradle (40) and the frame forming press cradle (40) will move upwards opening up to a half circle shape again. The curved screen element frame (85) is then removed from the frame forming press cradle (40) and the forming process is complete for curved screen element frame (85).

Example 6

Description and Operation of the Fluidized Bed

Fluidized powdered epoxy resins are applied by dipping heated metal parts into an aerated powder bed. The powdered resin coats the hot metal part, and melts. The result is a smooth, continuous plastic film encapsulating the metal part. It should be noted, however, that although a metal part may be coated with epoxy, the epoxy may or may not be cured. If the epoxy is not yet cured, certain advantages may be gained by re-melting the epoxy coat and then curing it, as described herein.

Figure 5:
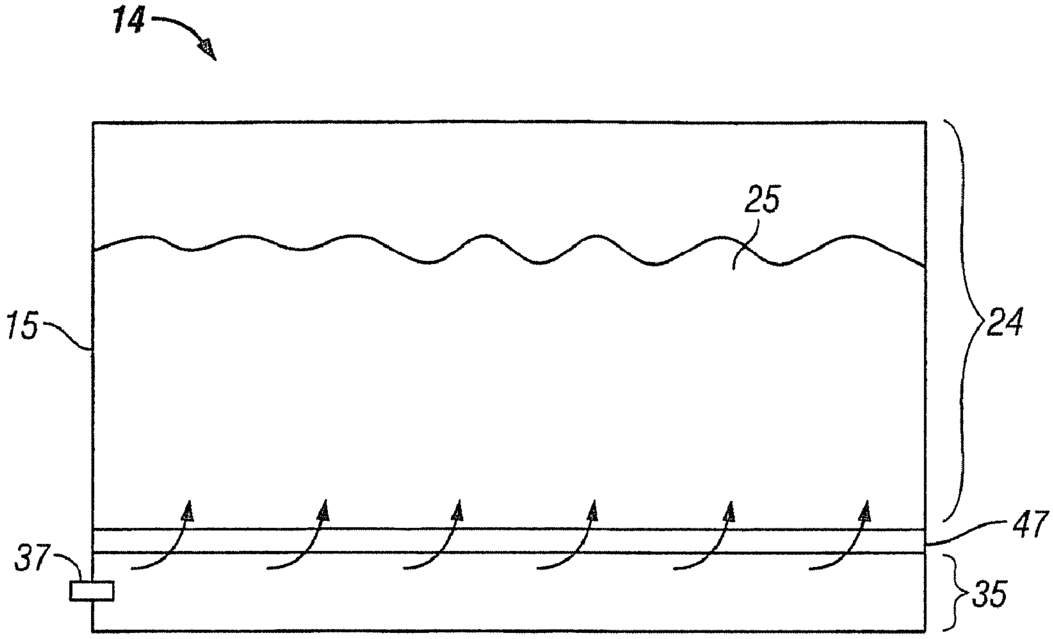
FIG. 5 shows a fluidized bed into which formed (curved) screen element frames are dipped after being heated.

The fluidized bed (14) of FIG. 5 includes a tank (15) which is divided into separate upper (24) and lower (35) compartments by a porous membrane (47). Fluidizable powdered epoxy resin (25) is placed into the upper compartment (24) via the open top of the tank (15). Compressed air is introduced into the lower compartment (35) via an air inlet (37). When the lower compartment (35) is pressurized, the porous membrane (47) allows a uniform air flow (arrows, FIG. 5) through its microscopic openings into the upper compartment (24).

The rising air surrounds and suspends the finely divided powdered epoxy (25) particles, causing the powdered epoxy (25) to float, or "fluidize" and form a dense-phase fluidized bed, and the powder-air mixture resembles a boiling liquid.

Example 7

Description of the Screen Element Laminating Press

FIG. 8 shows the operation of the screen element laminating press. The press itself is constructed like the screen element frame forming press (21) with the exception of having a round heating element (73) attached to the pneumatic cylinders (22). Inside the round heating element (73) is a tubular internal heating element (66). The round heating element (73) is heated to approximately 430° F. The required temperature for melting and curing the epoxy (25) on the coated frame (88) depends on the time the heater is kept against the frame. The lower the temperature, the longer time is required to cure the epoxy. Desired temperature range is preferably between 350-500° F. When the round hearing element (73) is heated to 430° F., it takes about five minutes to cure the epoxy. The combination of proper time and temperature is required to produce a finished product without over bleeding of epoxy on the screen cloth and with the precut screen cloth layers (92) taut and free of wrinkles.

TABLE 1

| Listing of Components | |
|---|---|
| 10 | forming element |
| 14 | fluidized bed |
| 15 | tank |
| 16 | cooling rack |
| 20 | hydraulic cylinders |
| 21 | screen element frame forming press |
| 22 | pneumatic cylinders |
| 24 | upper compartment |
| 25 | epoxy |
| 30 | support structure |
| 31 | molding press |
| 35 | lower compartment |
| 37 | air inlet |
| 40 | frame forming press cradle |
| 42 | heat lamination press cradle |
| 45 | cradle side extension |
| 46 | cradle side extension |
| 47 | porous membrane |
| 50 | horizontal side support |
| 55 | cradle side extension |
| 56 | cradle side extension |
| 60 | horizontal side support |
| 66 | tubular internal heating element |
| 70 | support beam |
| 73 | round heating element |
| 80 | screen element frame |
| 85 | curved screen element frame |
| 86 | finished screen element |
| 88 | coated frame |
| 89 | laminated screen element |
| 90 | semi-circular cradle bottom |
| 91 | cradle bottom |
| 92 | precut screen cloth layers |
| 98 | support frame |
| 99 | sealing |

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A method for producing a laminated screen element comprising the following steps:
- providing a sheet of thin metal plate;
- providing at least one layer of screen cloth;
- providing epoxy;
- providing a frame forming press comprising a cradle having a semi-circular interior bottom surface with a cradle first side extension and a cradle second side extension extending from opposite sides of said cradle bottom surface, wherein said cradle first side extension is positioned on a first support and said cradle second side extension is positioned on a second support;
- providing a laminating press;
- perforating the sheet of thin metal plate to produce a screen element frame having perforations;
- positioning the screen element frame substantially horizontally between said cradle first and second side extensions;
- pushing the screen element frame downward into said cradle against said cradle interior bottom surface with a forming element;
- moving said cradle first and second side extensions inwardly toward each other with the first and second supports during the step of pushing;
- forming said cradle interior bottom surface to be more than a half circle during the step of pushing;
- curving the screen element frame with the frame forming press to produce a semi-circular curved screen element frame;
- coating the curved screen element frame with epoxy;
- placing the curved coated frame into the laminating press, and placing the at least one layer of screen cloth over the coated frame in said laminating press; and
- heating the coated frame and the at least one layer of screen cloth placed over the coated frame in the laminating press by contacting with a heating element, thereby producing a laminated screen element.

2. The method of claim 1, wherein said first and second supports do not move during said step of moving said cradle first and second side extensions inwardly toward each other.

3. The method of claim 1, wherein said cradle first and second side extensions extend outwardly from said cradle bottom surface at approximately 45 degrees.

4. The method of claim 1, wherein the curved screen element frame is cleaned before said step of coating the curved screen element frame with epoxy.

5. The method of claim 4, wherein said cleaning is by dipping the curved screen element frame into a caustic bath, thereby producing a cleaned frame.

6. The method of claim 5, wherein said cleaned frame is heated to a temperature between 400° F. and 600° F., thereby producing a heated frame, before said step of coating the curved screen element frame with epoxy.

7. The method of claim 6, wherein said epoxy is a fluidizable powdered epoxy resin.

8. The method of claim 7, wherein said fluidizable powdered epoxy resin is fluidized, and the heated frame is passed through the fluidized powdered epoxy resin, thereby coating the curved screen element frame with epoxy and producing a coated frame.

9. The method of claim 8, wherein said at least one layer of screen cloth is precut to a surface area approximating that of the curved screen element frame.

10. The method of claim 9, wherein said step of heating the coated frame and the at least one layer of screen cloth placed over the coated frame in the laminating press is at a temperature and for a time sufficient to allow the epoxy to be pushed through the at least one layer of screen cloth, and to cure.

11. The method of claim 10, wherein any of the at least one layer of screen cloth that extends beyond the outer edges of the coated frame is trimmed from said laminated screen element.

12. A method for producing a laminated screen element, comprising the steps of:

perforating a sheet of thin metal plate to produce a screen element frame having perforations;

curving the screen element frame with a frame forming press to produce a semi-circular curved screen element frame;

heating the curved screen element frame to a temperature ranging from 400° F. to 600° F.;

dipping the heated curved screen element frame into a fluidized bed containing epoxy;

coating the curved screen element frame with epoxy that has not been cured;

cooling the coated curved screen element;

providing a laminating press comprising a cradle having a semi-circular interior bottom surface with a cradle first side extension and a cradle second side extension extending from opposite sides of said cradle bottom surface, wherein said cradle first side extension is positioned on a first support and said cradle second side extension is positioned on a second support;

placing the curved coated frame into said laminating press cradle, and placing at least one layer of screen cloth over the coated frame in said laminating press;

heating and pressing at substantially the same time the coated frame and the at least one layer of screen cloth placed over the coated frame in the laminating press with a heating element, and melting and curing the epoxy;

pushing the coated frame downward into said laminating press cradle against said cradle interior bottom surface with said heating element while said cradle first and second side extensions are moved inwardly toward each other by the first and second supports; and forming said cradle interior bottom surface to be more than a half circle during the step of pushing.

13. The method of claim 12, further comprising the step of:

cleaning the curved screen element frame in a caustic bath before the step of heating to a temperature ranging from 400° F. to 600° F.

14. The method of claim 12, wherein the curved screen element frame is kept in the fluidized bath for one to seven seconds during the step of dipping.

15. The method of claim 12, wherein the step of heating and pressing lasting four to five minutes.

16. The method of claim 15, wherein the step of heating and pressing performed at a temperature ranging from 350° F. to 500° F.

17. The method of claim 12, wherein said epoxy is a fluidizable powdered epoxy resin.

18. The method of claim 17, wherein said fluidized bed comprising a tank divided into upper and lower compartments by a porous membrane, and further comprising the steps of:

placing the fluidizable powdered epoxy resin in said tank upper compartment; and pressurizing the lower compartment with compressed air.

19. The method of claim 18, further comprising the step of:

moving said compressed air through said porous membrane and suspending said powdered epoxy resin.

20. The method of claim 12, wherein said step of heating and pressing performed by a laminating press round heating element attached to a pneumatic cylinder.

* * * * *